Aug. 19, 1958 E. A. WACHSMUTH Re. 24,522

FREE-PISTON MOTOR-COMPRESSORS

Original Filed July 8, 1952 5 Sheets-Sheet 1

Inventor:
Erich A. Wachsmuth
by Louis A. Mason
Attorney

FREE-PISTON MOTOR-COMPRESSORS

Original Filed July 8, 1952 5 Sheets-Sheet 2

Inventor
Erich A. Wachsmuth.
By Emil A. Ulmann.
Attorney.

FREE-PISTON MOTOR-COMPRESSORS

Original Filed July 8, 1952 5 Sheets-Sheet 3

Inventor:
Erich A. Wachsmuth.

By

Louis A. Wanson.

Attorney.

FREE-PISTON MOTOR-COMPRESSORS

Original Filed July 8, 1952 5 Sheets-Sheet 4

Inventor:
Erich A. Wachsmuth
by
Louis A. Maxson
attorney.

FREE-PISTON MOTOR-COMPRESSORS

Original Filed July 8, 1952 5 Sheets-Sheet 5

Inventor:
Erich A. Wachsmuth
by
Louis A. Mason
attorney.

United States Patent Office

Re. 24,522
Reissued Aug. 19, 1958

24,522

FREE-PISTON MOTOR-COMPRESSORS

Erich A. Wachsmuth, Michigan City, Ind.

Original No. 2,755,988, dated July 24, 1956, Serial No. 297,745, July 8, 1952. Application for reissue March 12, 1958, Serial No. 721,068.

Claims priority, application Germany July 11, 1951

25 Claims. (Cl. 230—56)

Matter enclosed in heavy brackets [ ] appears in the original patent but forms no part of this reissue specification; matter printed in italics indicates the additions made by reissue.

This invention relates to free-piston motor-compressors, and more particularly to free-piston motor-compressors of what may be called the counterstroke type. By this term it is to be understood that two (or a multiple of two) motor-compressor units of the opposed piston type are so arranged and connected that the work strokes of the motor pistons of one unit are attended by the compression strokes of the motor pistons of the other unit, there being mechanical connections between corresponding piston pairs of the units and also mechanical connections between the mechanically connected pairs so that compression strokes will always attend working strokes, and the constituent elements of the complete organization shall be properly synchronized. The term "mechanically" is to be broadly understood as including all connections, including hydraulic, suited to the maintenance of the needed synchronization.

Among the problems which arise in connection with free-piston motor-compressors are those of starting, regulation to meet varying air demand, and attendant regulation of power delivered by the motor pistons of the apparatus, minimization of size in proportion to output, and the avoidance, from the standpoints of simplicity, expense and efficiency, of all adjuncts which may soundly be dispensed with.

In my application, Serial No. 285,472, filed May 1, 1952, *now abandoned,* for Starting and Regulating Method for Free-Piston Compressors and Apparatus for the Starting and Regulation of Such Compressors, I have disclosed, as the title indicates, an arrangement for meeting certain of the problems associated with free-piston compressors, and in this present application a highly desirable solution for the others of the problems mentioned is disclosed.

Through the use of a counter-stroke free-piston arrangement, in which the work necessary to effect compression in one set of motor cylinders, in addition to the work of air compression in the compressor cylinders associated with the other set of motor cylinders, is furnished by the power generated in the latter cylinders, formerly essential measures for the pneumatic accumulation of the power needed to effect compression within the motor cylinders are no longer needed, and the large dead spaces of the compressor cylinders characteristic of ordinary free-piston machines are eliminated, as well as special buffer spaces for energy accumulation.

And by virtue of explosive starting, the need for special pneumatic starting arrangements is removed.

But only if extreme motor simplification and high motor efficiency can be secured is an optimum aggregate possible. A diesel-type motor, with opposed pistons and with scavenging ports adjacent one end of the common cylinder for two opposed motor pistons and with exhaust ports adjacent the other end will provide a very desirable arrangement, provided adequate scavenging be obtainable without the sacrifice of simplicity of design or freedom from multiplicity of adjuncts. With the elimination of the large difference between the diameter of the motor pistons and that of the compressor pistons of free-piston motor-compressors as heretofore constructed (which provided, as it were, scavenging pump means inherent in the unit), this mode of effecting scavenging is not available; and the use of a separate scavenging pump system—and particularly of a multiple-unit system which a counterstroke free-piston arrangement might call for if a separate scavenging pump system were adopted—would be completely inconsistent with the desired simplicity of the apparatus.

With the machine such as is shown in application Serial No. 285,472, *now abandoned,* however, by the use of suitable exhaust and scavenging arrangements, the complete avoidance of any special scavenging devices is possible, and a further improvement of the mechanical efficiency of the machine is attained by the elimination of the scavenging work to which the machine otherwise would have to be subjected, and an increased reliability by the elimination of valve trouble. Unidirectional scavenging is a factor in this possibility. Again, the fact is very important that from the first stroke, and practically independent of the load, the machine operates at a substantially constant rate, so that, notwithstanding the differences in the temperatures of the gases in the exhaust lines between starting and working, a satisfactory operation and starting with self-scavenging without additional scavenging aids, and without any need for adjustment of the exhaust system is obtained.

Briefly, then, there is made possible, with a motor-compressor constructed and controlled as in said earlier application, through the proper location, sizing and shaping of the exhaust arrangements and of the scavenging ports, an entirely automatic self-scavenging without any auxiliary scavenging air supply, through the utilization of the pressure drop below atmospheric pressure which—by the employment of an exhaust line which, regarding its volume, is suited to the working frequency of the machine—takes place in the cylinder and in the adjacent portion of the exhaust piping until almost to the point of closing of the exhaust ports by the piston, which pressure drop results in a filling of the cylinder, and even, momentarily, a part of the exhaust passages, with pure air and a total mass of air in the cylinder when the exhaust is overrun (covered) by the piston which traverses it actually in excess of the mass of a volume of air, at atmospheric pressure, equal to the cubic contents of the cylinder at that moment.

It is an object of the invention to provide an improved free-piston motor-compressor—and particularly one of maximum simplicity of construction, free of all auxiliary devices for the provision of extra scavenging air, and wholly automatic in operation from starting throughout operation under all normal conditions. Other objects and advantages of the invention will hereinafter appear.

In the accompanying drawings, in which one illustrative embodiment which the invention may assume in practice certain detail modifications are shown:

Figure 1:
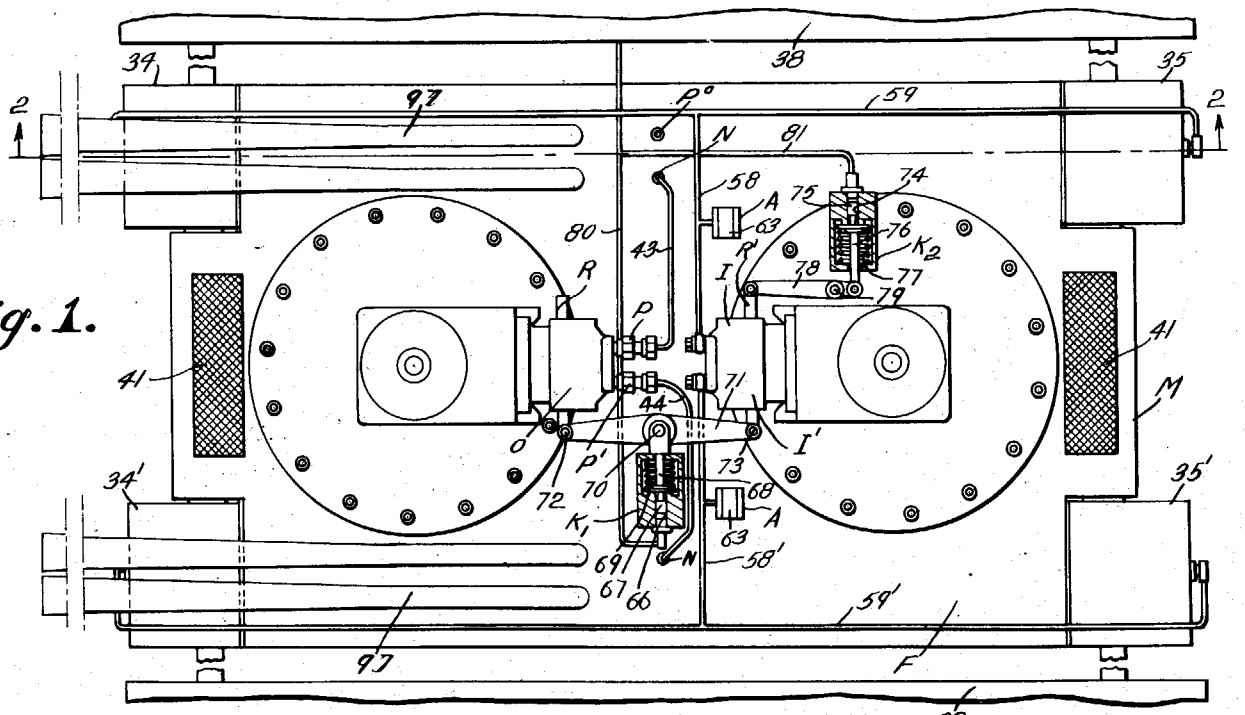
Fig. 1 is a side elevational view of a free-piston motor-compressor constructed in accordance with such illustrative embodiment, certain parts being shown in section and certain details of construction not needed for understanding the invention being omitted.
Figure 2:
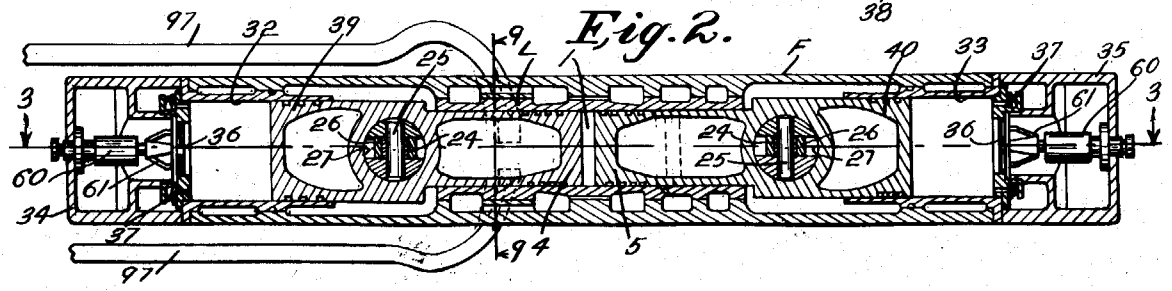
Fig. 2 is a horizontal, longitudinal section, on the plane of the line 2—2 of Fig. 1, through one pair of motor-compressor piston couples, associated cylinders, etc.
Figure 3:
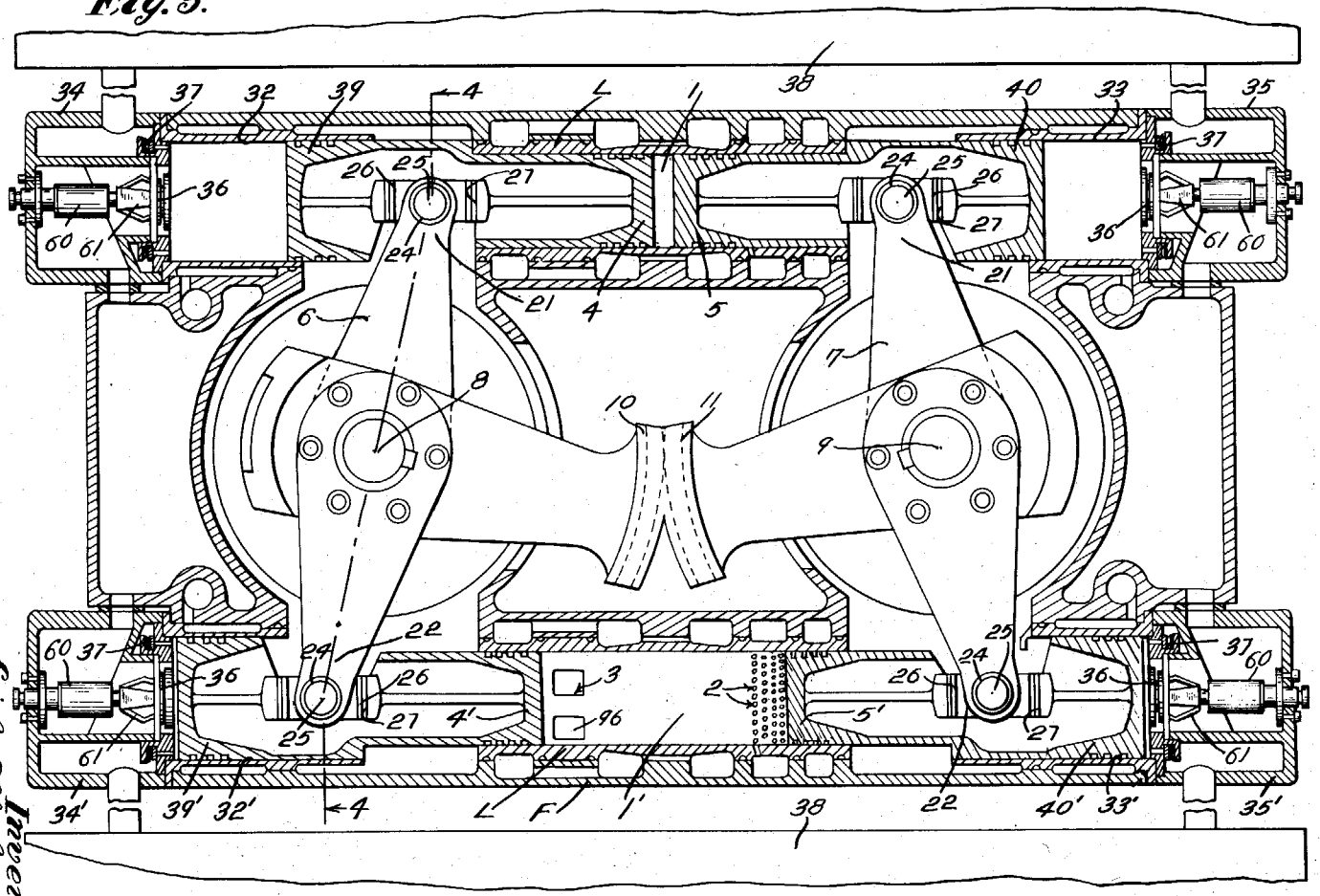
Fig. 3 is a central, longitudinal vertical section through the motor-compressor on the plane of the line 3—3 of Fig. 2.

Referring now to the drawings, it will be noted that the motor-compressor M comprises, as shown, twin motor cylinders 1, 1' which have their axes at least substantially parallel and which are supported by a frame F. The cylinder bores are formed in liners L, whose construction will be further described at a later point in this specification. In the motor cylinders 1, 1' there are reciprocable, in counterstroke relation to each other, pistons 4, 5 and 4', 5', and these control scavenging ports 2 and exhaust ports 3, both of which port arrangements will be discussed in detail hereinafter.

The four pistons, formed as differential pistons, are coupled in pairs (4 with 4' and 5 with 5'), each pair by a double-armed rocker or centrally pivoted lever, the pair 4, 4' by the rocker 6 and the pair 5, 5' by the rocker 7, so that the outward travels (the working strokes) of the pistons 4, 5 associated with the cylinder 1 occur as the inward (compression) strokes of the pistons 4', 5' in the cylinder 1' take place, and vice versa. The two double-armed rockers 6 and 7 are supported for rocking movement respectively by shafts 8 and 9 journaled in the frame F, and they have in fixed relation to them two gear segments 10 and 11 which swing in the same directions as their respective rockers; and these two segments, through their mutual engagement, prevent the piston systems from getting out of synchronism with each other. The outer ends of the double-armed rockers are designated 21 and 22 and provided with bearings 24 surrounding pins 25 supported in box or slide elements 26 slidably arranged in guideways 27 extending transversely to the several pistons and providing for guided movement of the elements 26 transversely of the pistons as the latter reciprocate.

Compressor cylinders 32 and 33 and 32' and 33' are disposed coaxially with the motor cylinders 1, 1', and are open at their ends toward the motor cylinders, but closed at their outer ends by cylinder heads 34, 35 and 34', 35' which carry the suction and discharge valves 36 and 37. Two receivers 38 are shown, to which compressor pistons 39, 40 and 39', 40' pump fluid. Air on its way to the suction valves enters the hollow frame F through filters 41.

The motor cylinders 1 and 1' have fuel pumped to them by pumps P and P' which form parts of a two-cylinder pump unit O and these pumps are actuated by the rocker shaft 8, by means of a double-acting cam C thereon, as will later be explained, and each supplies appropriately timed, properly measured shots (injections) of fuel oil to the motor cylinder with which it is correlated through an injection nozzle of any suitable form and not illustrated in detail because of its conventional character. The timing of fuel injection and the quantity of fuel injected is controlled as will be later explained. The fuel conducting conduits from the pumps P and P' are respectively designated 43 and 44, and the injection nozzles are indicated at 45 and 46. The fuel oil supply system to the pumps, being conventional, needs no illustration.

The cylinders 1 and 1' are provided with connections N for receiving the injection nozzles, and, in addition, one of the cylinders, herein the cylinder 1, is provided at its mid-point, longitudinally, with a chamber structure $P^o$ communicating with the mid-point of the motor cylinder bore, and having suitable firing mechanism (not shown) associable with it.

To start the motor-compressor, the pistons 4, 5, are brought in any suitable manner to their mutually adjacent "dead center" position, and a small cartridge, provided with a correctly measured powder charge, is inserted in the chamber structure $P^o$, and, when this powder charge is ignited, the pistons are forced apart in cylinder 1, and compression is effected in cylinder 1', so that injection of fuel into cylinder 1' as the pistons 4', 5' compress the air between them in the cylinder 1' will result in an explosion occurring in cylinder 1' and a forcing apart of the pistons 4' and 5' and a concurrent driving together again of the pistons 4, 5. Each time the pistons uncover the exhaust and scavenging ports which they control exhaust and scavenging will be automatically effected as will be later described; and, upon the compression strokes of the motor pistons, the new charges of air will be compressed (and heated) and upon fuel injection, new working strokes will be caused to take place, and, as will be later explained, no auxiliary scavenging air supply means will be needed, and running will be continued under the control of the apparatus which will now be described in some detail. The exhaust and scavenging arrangements, their operation, and why they so operate will be later described and explained.

As previously indicated, the internal combustion engine cylinders 1 and 1', which are illustrated as forming portions of opposed piston, diesel engine units, are adapted to have fuel oil pumped to them respectively by the pumps P and P' of a two-cylinder fuel pump O. The construction of these pumps may be of any suitable conventional form, having provision for automatic variation of the instant of fuel delivery and the duration of such delivery, the variation being effected in a generally well-known manner, as by the reciprocation of a rack bar R, which rotates the pump plungers on their axes in such a manner as to vary the fuel delivery of the pump between a maximum and zero. By the proper shaping of the usual slanting control edge of the pump plunger, practically any rate of fuel delivery can be effected as a function of the angle of rotation of the pump plungers. In view of the full discussion in Serial No. 285,472 *now abandoned*, there need be no extended discussion of this here, and it may simply be said, for purposes of illustration, that the rack bar R is displaced as a function of receiver pressure under the control of a receiver pressure responsive cylinder and piston mechanism $K_1$, and that the control edge of the pump plunger will be so formed and the movements of the rack bar R be coordinated with receiver pressure in such a manner that when receiver pressure is at atmospheric pressure there is supplied the proper quantity of fuel to be burned to effect starting; when receiver pressure is at 14.7 pounds gauge there is supplied the proper quantity of fuel to be burned to effect the compression and discharge against that pressure of the quantity of air taken in; and as receiver pressure increases the quantity of fuel injected is properly increased. Of course, the quantity of fuel injected at each receiver pressure provides for the work of compression of the scavenging air supplied to the motor, as well as for the compression and discharge of air taken into the compressor cylinders.

Another receiver pressure responsive device $K_2$ controls the quantity of air delivered, and this pressure responsive device, which becomes operative as a control as soon as receiver pressure exceeds the normal lower limit of the designed operating range, for example, seven atmospheres gauge, does so through hydraulic impulse givers I, I′ which may be of essentially the same type of construction as the pumps P, P′. Within the normal operating range, say from 7 atmospheres gauge to 7.7 atmospheres gauge, the device $K_2$—another cylinder and piston mechanism as shown—adjusts the amount of air delivered by the compressor all the way from maximum down to zero delivery, if receiver pressure continues to rise, as might occur if all air use were discontinued. The impulse givers I, I′ as illustrated are arranged side by side, one above the other, and are adapted to be caused to give their impulses in alternation by suitable cam actuating means C′. The pumps P, P′ and the impulse givers I, I′ are respectively actuated by cams C and C′, each, as shown, a double cam, mounted respectively on the shafts 8 and 9. As in the case of the fuel pump, the control element of each impulse giver is a plunger with a sloping control edge reciprocated in rhythm with the motor-compressor piston with which it is coordinated and moving in a bore in a cylinder which is provided for it. The shape of the control edge is determined empirically, in connection with the mechanical coupling for the control rod of the fuel pump, so that for each load stage of the compressor the work output of the motor and the work absorbed by the compressor are in equilibrium.

During each reciprocation of its pistons the impulse givers I and I′ produce hydraulic impulses which are used to control fingers cooperating with the compressor suction (inlet) valves in such a way that the suction valves are held open for a smaller or larger portion of the compression strokes of the compressor pistons 39, 40 and 39′, 40′. Each of the impulse givers acts simultaneously on two finger systems, one associated with each of the alined compressor cylinders of a pair. In application Serial No. 285,472 two different possible means for effecting different degrees of unloading are illustrated. In this present application but one will be described for purposes of illustration, and it will correspond generally to the second means disclosed in the earlier filed case mentioned.

Figure 5:
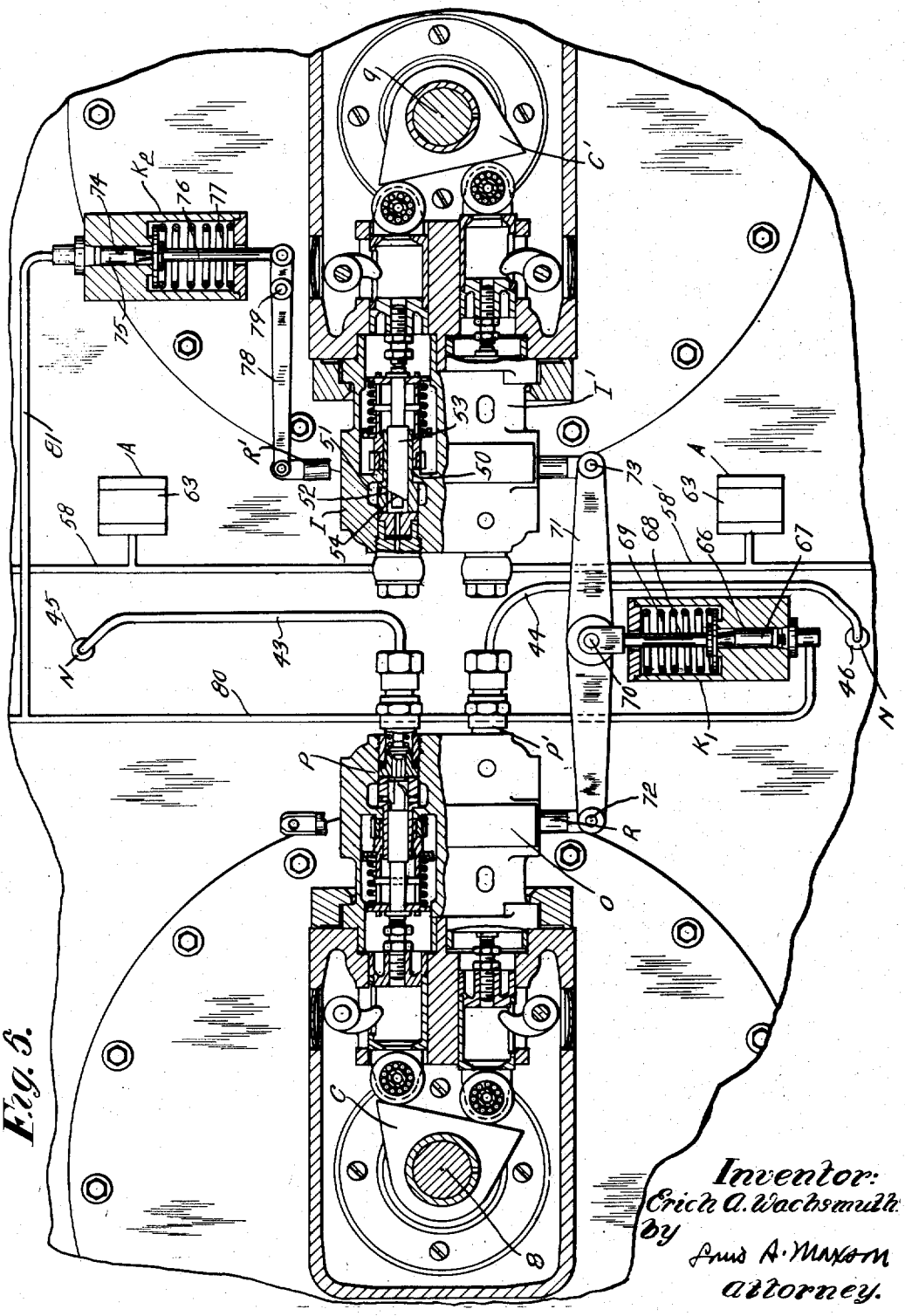
Fig. 5 is a considerably enlarged, fragmentary, longitudinal, vertical section on the plane of the line 5—5 of Fig. 4 through the fuel pumps and hydraulic impulse givers later described and the controls therefor.

The impulse givers I and I′ each comprise, as shown in Fig. 5, a cylinder 50 connected with a supply space 51 to which a hydraulic fluid is conducted from any suitable reservoir (not shown), by a port 52, and containing a plunger 53 having a control edge 54 generally helically extending about its periphery at its working end. The plungers are actuated in turn by the cam C′ and are adapted to be rotated by a rack bar R′ under the control of the pressure responsive device $K_2$ to change the timing of the fluid impulses. The cylinder 50 of the impulse giver I is connected by conduits with cylinder and piston mechanisms which open the inlet valve associated with the cylinders 32 and 33, and the impulse giver I′ is similarly connected by conduits with cylinder and piston mechanisms which open the inlet valves of the cylinders 32′ and 33′. These conduits are numbered 58 and 59 in the case of impulse giver I and 58′ and 59′ in the case of impulse giver I′. These last cylinder and piston mechanisms, numbered 60 actuate finger mechanisms 61 which are arranged to unseat and hold open inlet valves and to have their valve opening movements limited by stops 62. To provide for necessary maintenance of the inlet valves open during a portion of the discharge strokes of the compressor pistons, an accumulator A is associated with each conduit 58, and comprises a chamber forming member 63 in which a spring 64 acts to press a septum-forming member 65 in a direction to minimize the volume of fluid in the chamber which communicates with the conduit 58. It will be understood that the accumulators A, may use diaphragms, bellows, or any other desired equivalents of pistons to minimize or prevent fluid leakage.

The outward (pumping) movements of the pistons or plungers 53, are, in the arrangement shown, coordinated with the suction strokes of the compressor pistons. In other words, the movements of the plungers in their cylinders occur during the suction strokes of the compressor pistons. The oblique control edges 54 determine the beginning of fluid delivery. The outwardly moving plungers at first force fluid from their cylinders back into the supply space and then, when the control port is covered—earlier or later depending on the amount of plunger rotation—by the slanting control edge on the plunger, fluid delivery to the conduits 58 or 58′ commences and the finger operating cylinder and piston mechanisms have their pistons move into position to hold the inlet valves in open position. After the finger operating pistons reach the limits of their movement, as determined by appropriate abutments or stops 62, the fluid delivered by further plunger movement is stored in the accumulator. Delivery and storage in the accumulator of fluid continues until the cam reaches its limit of swing, and upon reverse movement of the cam the system still remains under the pressure resulting from the presence of the accumulator until the latter is empty. Only then do the inlet valves close. The inlet valves close at the moment the slanting control edge uncovers the bypass port. The plungers continue inward movement in their cylinders, and the space being enlarged by inward movement of the plunger is filled from the supply space until the dead position is reached.

Further details with respect to this mechanism may be had by reference to the copending application hereinabove mentioned.

As previously noted, the adjustment of the fuel supply to the work of compression and discharge of the air (which is dependent on the receiver pressure), and of the quantity of air to be handled, are obtained by giving a suitable form to the fuel-pump control-edges and to the control-edges of the impulse givers controlling the quantity of air delivered, and rotating the plungers of these devices on their axes.

Pressure responsive device $K_1$, as above pointed out, is a device acting between p. s. i. gauge and the lower limit of the designed pressure range, and it consists of a cylinder 66, a piston 67 having a piston rod 68, and a spring 69. 70 represents the point of pivotal connection of the piston rod 68 with a two-armed lever 71, which is connected, on the one hand, at 72, with the regulating rack R of the fuel pumps P and P′, and, on the other hand, at the articulation point 73, with the regulating rack bar R′ of the impulse givers I and I′ which control the quantity of air pumped by the compressor. The pressure responsive device $K_2$ acting over the pressure range between the lower and the upper designed operating pressures consists of a cylinder 74, a piston 75 having a piston rod 76, and a spring 77 suitably tensioned to cause it to commence to yield only when the lower rated pressure (as above explained, for illustration, 7 atmospheres) is exceeded. (It may be made responsive to the excess of receiver pressure over a predetermined pressure, by the use of a suitable relief valve permitting only the excess to pass it.) Due to the high spring tension and the relatively small effective pressure, the active range of this device is but small. It transmits, via a lever 78, pivoted at 79 and acting on the control element R′ at the other end of the latter, adjustments to the regulating-rod R′ necessary for the regulation to be accomplished between zero- and full-load. 80 and 81 are pressure lines connecting the devices $K_1$ and $K_2$ respectively with the receiver.

It will be understood that with twin pumps and twin hydraulic impulse givers the elements R and R′ might be duplicated, each pump and each impulse giver having a control rack individual to it and those of each pair being then concurrently actuated. This duplication, however, is unnecessary.

The symmetrical arrangement of the fuel pumps and impulse givers makes it requisite that the cams which actuate them be arranged with their angled control surfaces facing towards each other.

The positions of the parts in Figs. 1, 2, 3, and 5 correspond to the conditions present before starting of the compressor. With rising receiver pressure, the piston 67 moves, against the pressure of the spring 69, upwardly in Fig. 5, while the piston 75, owing to the considerably higher initial tension of the spring 77, remains at first at rest. The piston 67, moving upwardly, displaces, through the lever 71, swinging about the then stationary point 73, the regulating rod R, in accordance with the increasing work of compression, toward full load position, which is reached at the upper position of the piston 67, corresponding to the lower limit of the designed normal pressure range. If the receiver pressure continues to rise further, the piston 75 commences to move downwardly, and to displace, through the rack bar R′, which thereupon moves upward, that is, in the direction of zero air delivery, and through the lever 71, which is now swinging about the now stationary point 70, the regulating rod R of the fuel pump downward, that is, toward no-load running position.

The motor-compressor described will operate, beginning with the very first stroke, at substantially its normal (designed) rate (strokes per minute), and will maintain substantial uniformity of rate regardless of load variations.

Figure 13:
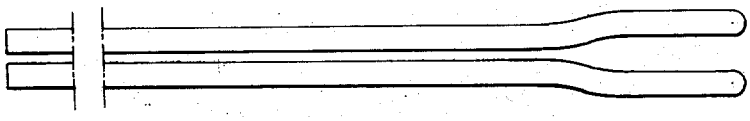
Fig. 13 is a detail of a different exhaust passage arrangement.
Figure 14:
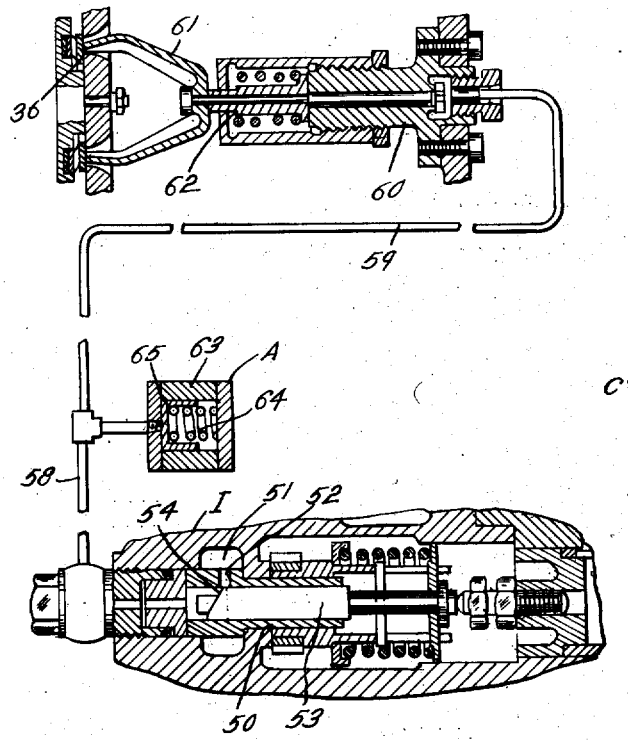
Fig. 14 is a fragmentary sectional view on an enlarged scale showing details of an impulse giver and associated parts.
Figure 4:
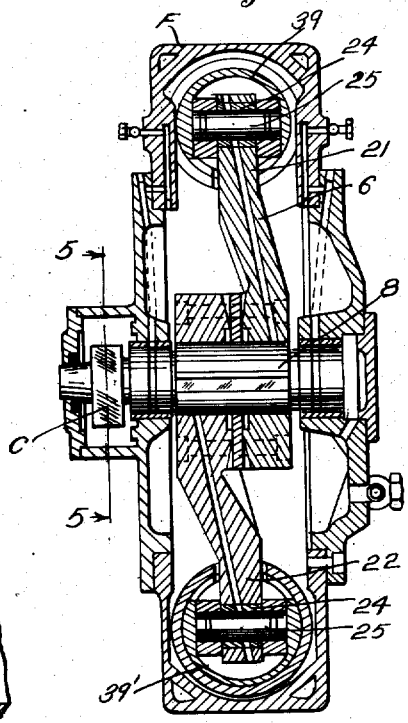
Fig. 4 is a generally vertical transverse section on the plane of the line 4—4 of Fig. 3.
Figure 10:
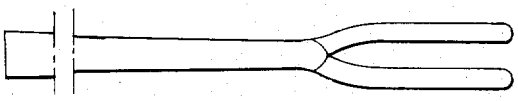
Fig. 10 is a detail showing a modified exhaust passage arrangement.

The several views disclosing the motor cylinder liner L may now be advantageously noted. It will be seen that this liner is formed with suitable circumferential ribs which serve to center it and, through their close fit with the surrounding wall of the frame F, provide seals for cooling water passages. It will be noted that centrally, lengthwise, the sleeve or liner L has an annular enlargement 91 which is traversed peripherally by obliquely longitudinally extending (helically arranged) grooves 92 for cooling water passage and which is traversed radially by threaded openings 93 for the reception of a fuel injection nozzle, and 94, for the chamber-forming device P° in which the powder charge is to be placed for starting. At opposite sides of its longitudinal center the liner is provided with exhaust openings and with scavenging, air-admitting, openings. The exhaust openings or slots, 96, are four in number, as shown, and these are tangentially directed, and each has associated with it an at least initially independent exhaust pipe 97—this for the conduction of the exhaust gases in as undisturbed and friction-free as possible a manner. Desirably, as shown in Fig. 1, the exhaust pipes may be conical, increasing in cross section as their extension from the exhaust ports increases. Cylindrical pipes, as shown in Fig. 13, are not excluded, but are considered less advantageous. A junction of two neighboring pipes is possible as shown in Fig. 10, and when this is employed the junction may well be made at a distance from the exhaust slots which corresponds to half the travel of the pressure wave front, later discussed, during the pre-exhaust periods.

The pipe length for best self-scavenging may be calculated approximately from the speed of the machine in cycles per minute, the instants and durations of opening of exhaust and scavenging ports, and the empirically determined rate of wave travel in the exhaust passages. In the illustrated machine, with about 1200 cycles per cylinder per minute, a pipe length of about 2.20 meters is arrived at by calculation. In making such calculations, one starts with the assumption that, substantially concurrent with the closing of the inlet or scavenging slots by the scavenging slot-overrunning piston, a compression wave arises at the still open exhaust slots which prevents, in spite of the movements of the motor pistons towards each other, any further pushing out of air during the period the exhaust ports remain open after closure of the scavenging slots, and makes possible in effect a degree of supercharging of the motor. The final determination of the optimum pipe length is empirical.

Figure 6:
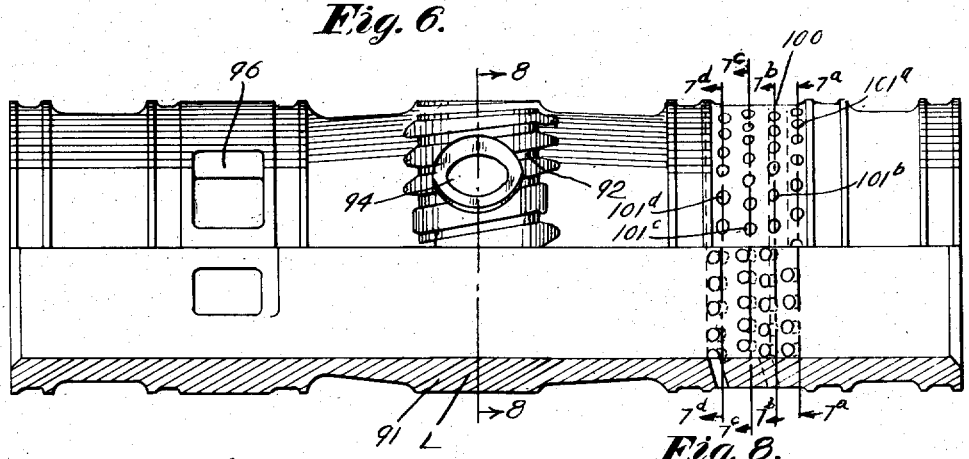
Fig. 6 is an enlarged view, partially in elevation and partially in longitudinal section, showing details of a motor cylinder liner.
Figure 7:
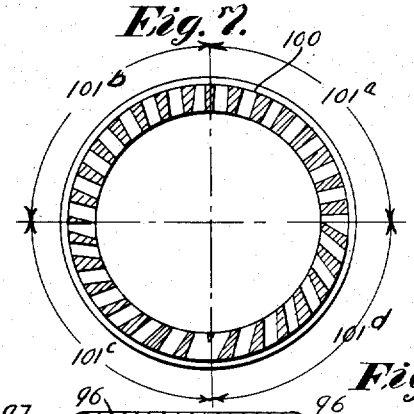
Fig. 7 is a composite sectional view on the planes of the lines $7^a$—$7^a$, $7^b$—$7^b$, $7^c$—$7^c$, and $7^d$—$7^d$ of Fig. 6, with one quadrant on each section, showing details of the scavenging port arrangement.
Figure 8:
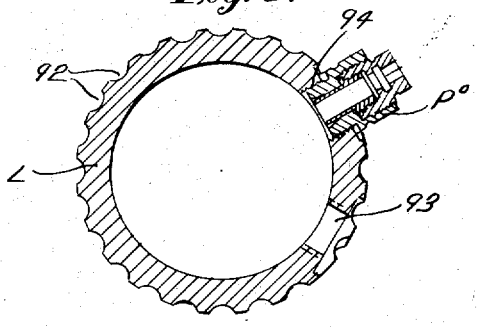
Fig. 8 is a transverse section on the plane of the line 8—8 of Fig. 6, through the central zone of the motor cylinder liner.
Figure 9:
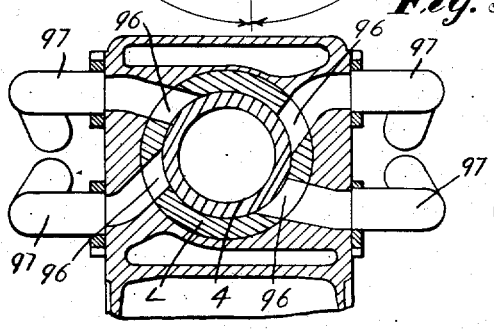
Fig. 9 is a transverse section on the plane of the line 9—9 of Fig. 2 showing the exhaust porting.

The scavenging port arrangement may now be noted. It will be observed, by inspection of Fig. 6, that there is formed a relatively wide circumferential groove 100, surrounding the liner L, and that, as shown, four rows of scavenging slots 101[a], 101[b], 101[c] and 101[d] traverse the wall of the liner and open into the groove 100. These rows, as may be seen from Fig. 7, are made up of port openings sloping slightly towards the exhaust openings and which, in the row most remote from the center point, longitudinally, of the sleeve or liner L have their axes in radial planes, and, in succeeding rows, have their axes in planes which are tangent to larger and larger cylinders, so that at the row first uncovered by the motor piston relatively great whirling action is given the entering air, and this whirling action is diminished in succeeding rows and is absent in the row which is last uncovered.

The row which is uncovered first and closes last is not uncovered until after a substantial opening of the exhaust ports has taken place, and the covering of this row takes place substantially before the exhaust ports are recovered by the piston which moves over them. The time interval between the initiation of opening of the exhaust ports 3 and the initiation of opening of the scavenging ports 2 is called the pre-exhaust period, and its duration is of considerable importance. It should be sufficient so that, at the full normal rated C. P. M. (cycles per minute) of each motor, there shall have been such a complete discharge of the combustion products that there shall be just commencing, in the portion of the cylinder through which the first uncovered scavening ports 2 open, to be a reduction of cylinder pressure below atmospheric, so that atmospheric air will rush through the scavenging slots not only due to the suction effect produced by the still mutually separating motor pistons but also due to the suction-pressure effect caused by the correspondingly dimensioned exhaust pipes. Due to this effect there will be produced, during the remainder of the separation strokes of the pistons, a condition in the motor cylinder which will result in a filling not only of the maximum volume thereof with clean scavenging air, but an actual flow into the portions of the exhaust pipes nearest the cylinder exhaust ports, of some of the scavenging air. Then, as the pistons reverse and move toward each other, there will be a pressure wave in the exhaust pipes which will, after the scavenging ports have again been covered, and despite the fact that the pistons are then approaching each other and that the exhaust ports are still partially open, not only prevent escape to the exhaust pipes of fresh scavenging air from the cylinder, but indeed will aid in a substantial supercharging effect, since there will be in the cylinder, in which a pressure increase is being effected by inward piston movement, a further pressure increase due to the additional air quantity forced in from the exhaust pipes. The exhaust ports will be closed off from communication with the cylinder bore before any products of combustion could attain to the cylinder from the exhaust pipes. The return movement of gases through the exhaust pipes will force the air that has entered those pipes back through the exhaust ports.

With this arrangement it will be noted that a substantial increase in power is provided, and a very efficient operation assured. Because of the particular nature and operating characteristics of the free-piston motor-compressor unit described it is possible to avoid the need for any auxiliary scavenging devices, or superchargers, and to start, and to maintain efficient operation throughout the entire range of load variations encountered in use.

Figure 12:
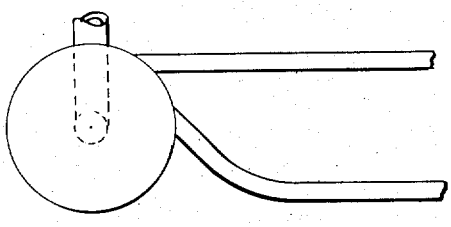
Fig. 12 is a bottom view of the structure of Fig. 11.
Figure 11:
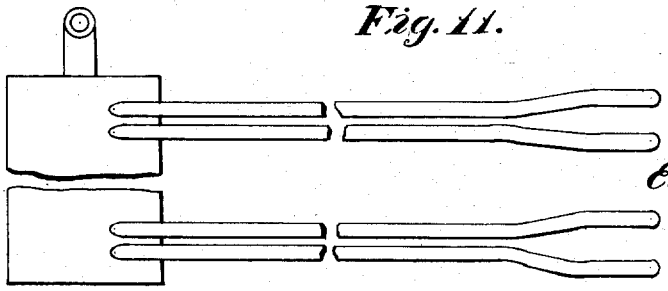
Fig. 11 shows an exhaust passage arrangement with a muffler.

It is possible to employ mufflers with apparatus of the character described; and Figs. 11 and 12 show an arrangement on which the balanced exhaust pipes, instead of opening directly to atmosphere, go to a common muffler, Fig. 11 showing a side view and Fig. 12 a bottom view of this arrangement.

Apparatus of the character hereinabove disclosed for purposes of illustration is capable of operating, with freedom from the disadvantages of conventional free-piston compressors, with minimum size per unit of air delivered, and without any auxiliary scavenging means whatever—i. e. wholly by self-scavenging (1) because of its explosion starting, permitting nice proportioning of the power to the work to be done on the first stroke, and immediate initiation of the working of the exahust gases in the exhaust line effecting self-scavenging; (2) because from the very first stroke on it can operate essentially at its designed number of cycles per unit of time, any such frequency variations as may occur initially not being sufficient to prevent satisfactory self-scavenging; (3) because the twin construction and counter-stroke relation between corresponding motor-compressor piston couples insures compression in one motor cylinder while the ignited fuel forces the pistons in the other motor cylinder apart; (4) because the apparatus enables the omission of so many not only now unnecessary, but poor efficiency engendering complications; (5) because of the effective matching at all times of power to work to be performed; and not to mention more in this summary, (6) because the self-scavenging insures an increase of power generated, as well as an avoidance of power losses through unneeded auxiliary scavenging pumps. Whether or not all of the enumerated factors are essential, they contribute to the improved results.

While there are in this application specifically described one form and certain modifications which the invention may assume in practice, it will be understood that this form and certain modifications of the same are shown for purposes of illustration, and that the invention may further be modified and embodied in various other forms without departing from its spirit or the scope of the appended claims.

What I claim is:

1. In combination, in a motor driven compressor, a diesel motor having fuel-pumping means having an adjustment for the quantity of fuel pumped and a compressor actuated by said motor and having a device for varying the quantity of fluid delivered per stroke, which device has an adjustment which controls the quantity of delivered fluid, a pressure responsive device responsive to compressor discharge pressure from atmospheric pressure to the lower limit of the designed operating range, another pressure responsive device responsive to compressor discharge pressure from said lower limit to the maximum desired compressor discharge pressure, an operating connection between said first mentioned pressure responsive device and said first mentioned adjustment by which said device causes said adjustment to increase fuel supply with increasing compressor discharge pressure, said operating connection including a lever to which, between its ends, said first mentioned pressure responsive device is connected and which has one of its opposite arms connected to said first mentioned adjustment, an operating connection between said second mentioned pressure responsive device and said second mentioned adjustment by which said second mentioned pressure responsive device causes said second mentioned adjustment to reduce the quantity of fluid compressed and delivered per stroke as compressor discharge pressure increases from said lower limit, and a further connection actuated by said second mentioned pressure responsive device and connected with the arm of said first mentioned lever which is not connected with said first mentioned adjustment for causing said first mentioned adjustment to reduce fuel delivery proportionally to reduction in fluid delivered, said diesel motor having a cylinder containing opposed pistons and exhaust ports uncovered by one of said pistons and scavenging ports uncovered by the other of said pistons at an instant at which motor cylinder pressure starts to fall below atmospheric, said exhaust ports having connecting with them an exhaust system in which successively there are produced a pressure wave, a sub-atmospheric pressure and a return pressure wave, the last two effecting the induction through the scavenging ports and the supply for compression within said motor cylinder of all the scavenging air required by said motor under any normal operating conditions.

2. In combination, in a motor driven compressor which comprises a diesel motor having fuel-pumping means having a plunger with a slanting control edge and having an adjustment for rotating said plunger to vary the quantity of fuel pumped, and a compressor having a control for varying the quantity of fluid delivered per stroke, which control has an adjustment which controls the quantity of delivered fluid, a pressure responsive device responsive to compressor discharge pressure from atmospheric pressure to the lower limit of the designed operating range, another pressure responsive device responsive to compressor discharge pressure from said lower limit to maximum desired compressor discharge pressure, an operating connection between said first mentioned device and said first mentioned adjustment by which said device causes said adjustment to increase fuel supply with increasing compressor discharge pressure, said operating connections including mechanical connections transmitting adjusting movements, directly proportional to the movement of said first pressure responsive device, to said plunger, an operating connection between said second mentioned device and said second adjustment by which said second mentioned device causes said second mentioned adjustment to reduce the quantity of fluid compressed and delivered per stroke as compressor discharge pressure increases from said lower limit, and a further connection actuated by said second mentioned device for causing said first mentioned adjustment to reduce fuel delivery proportionally to reduction in fluid delivered, said diesel motor having a cylinder containing opposed pistons and exhaust ports uncovered by one of said pistons and scavenging ports uncovered by the other of said pistons at an instant at which motor cylinder pressure starts to fall below atmospheric, said exhaust ports having connecting with them an exhaust system in which successively there are produced a pressure wave, a sub-atmospheric pressure and a return pressure wave, the last two effecting the induction through the scavenging ports and the supply for compression within said motor cylinder of all the scavenging air required by said motor under any normal operating conditions.

3. In combination, in a motor driven compressor, a diesel motor having fuel-pumping means having an adjustment for the quantity of fuel pumped and a compressor actuated by said motor and having a device for varying the quantity of fluid delivered per stroke, which device has an adjustment which controls the quantity of delivered fluid, a pressure responsive device responsive to compressor discharge pressure from atmospheric pressure to the lower limit of the designed operating range, another pressure responsive device responsive to compressor discharge pressure from said lower limit to the maximum desired compressor discharge pressure, an operating connection between said first mentioned pressure responsive device and said first mentioned adjustment by which said device causes said adjustment to increase fuel supply with increasing compressor discharge pressure, an operating connection between said second mentioned pressure responsive device and said second mentioned adjustment by which said second mentioned pressure responsive device causes said second mentioned adjustment to reduce the quantity of fluid compressed and delivered per stroke as compressor discharge pressure increases from said lower limit, and a further connection actuated by said second mentioned pressure responsive device for causing said first mentioned adjustment to reduce fuel delivery proportionally to reduction in fluid delivered, said diesel motor having a cylinder containing opposed pistons and exhaust ports uncovered by one of said pistons and scavenging ports uncovered by the other of said pistons at an instant at which motor cylinder pressure starts to fall below atmospheric, said exhaust ports having connecting with them an exhaust system in which successively there are produced a pressure wave, a sub-atmospheric pressure and a return pressure wave, the last two effecting the induction through the scavenging ports and the suppy for compression within said motor cylinder of all the scavenging air required by said motor under any normal operating conditions.

4. In combination, in a motor driven compressor which comprises a diesel motor having a fuel-pumping means having a plunger and an adjustment for rotating said plunger to vary the quantity of fuel pumped, and a compressor having a control for varying the quantity of fluid delivered per stroke, which control has an adjustment which controls the quantity of delivered fluid, a pressure responsive device responsive to compressor discharge pressure from atmospheric pressure to the lower limit of the designed operating range, another pressure responsive device responsive to compressor discharge pressure from said lower limit to maximum desired compressor discharge pressure, an operating connection between said first mentioned device and said first mentioned adjustment by which said device causes said adjustment to increase fuel supply with increasing compressor discharge pressure, said operating connections including mechanical connections transmitting adjusting movements, directly proportional to the movement of said first pressure responsive device, to said plunger, an operating connection between said second mentioned device and said second adjustment by which said second mentioned device causes said second mentioned adjustment to reduce the quantity of fluid compressed and delivered per stroke as compressor discharge pressure increases from said lower limit, and means actuated by said second mentioned device for causing said first mentioned adjustment to reduce fuel delivery proportionally to reduction in fluid delivered, said diesel motor having a cylinder containing opposed pistons and exhaust ports uncovered by one of said pistons and scavenging ports uncovered by the other of said pistons at an instant at which motor cylinder pressure starts to fall below atmospheric, said exhaust ports having connecting with them an exhaust system in which successively there are produced a pressure wave, a sub-atmospheric pressure and a return pressure wave, the last two effecting the induction through the scavenging ports and the supply for compression within said motor cylinder of all the scavenging air required by said motor under any normal operating conditions.

*5. In an apparatus for regulating the operation of an internal combustion engine operated free-piston compressor having a normal working range having lower and upper limits, said internal combustion engine operated free-piston compressor having also a discharge pressure range traversed during its building up of its discharge pressure to the lower limit of such normal range, the period of operation of said internal combustion engine operated free-piston compressor during the building up of its discharge pressure to the lower limit of its normal working pressure range being hereinafter referred to as period (1) and the period of operation between such upper and lower limits being hereinafter referred to as period (2), in combination, two expansible chamber devices, each subjected to and governed by compressor discharge line pressure, one effective to exercise control during period (1) aforesaid and the other during period (2) aforesaid, a fuel pump having a regulating element, a lever movable to control said regulating element in such a manner that actuation of said lever in a given direction effects increasing fuel quantity delivery, said one expansible chamber device operatively connected with said lever to move the latter in a direction to increase fuel quantity with increasing compressor discharge pressure and said one pressure responsive device having a limited motion at the extreme of which it arrives when the pressure in the compressor discharge line reaches the lower limit of the normal working pressure range, and said other expansible chamber device being set to commence to operate when the compressor discharge pressure reaches said lower limit and constructed to attain to a limit of operation when the compressor discharge pressure reaches the upper limit of the normal working pressure range, said second expansible chamber device acting on said lever to move the same, upon increasing discharge line pressure, in a direction to decrease fuel quantity and when it reaches its limit of operation reducing fuel quantity to that requisite for no-load operation, and a device controlling the volume of air compressed and connected with said lever and movable to reduce the volume of air compressed, as the injected fuel quantity is reduced, from a maximum to zero.*

*6. In combination, in a motor driven compressor which comprises fuel-pumping means having an adjustment for the quantity of fuel pumped, a device for varying the quantity of fluid delivered per stroke which device has an adjustment which controls the quantity of delivered fluid, a pressure responsive device responsive to compressor discharge pressure from a base pressure to the lower limit of the designed operating range, another pressure responsive device responsive to compressor discharge pressure from said lower limit to maximum desired compressor discharge pressure, an operating connection between said first mentioned pressure responsive device and said first mentioned adjustment by which said pressure responsive device causes said adjustment to increase fuel supply with increasing compressor discharge pressure, an operating connection between said second mentioned pressure responsive device and said second adjustment by which said second mentioned pressure responsive device causes said second mentioned adjustment to reduce the quantity of fluid compressed and delivered per stroke as compressor discharge pressure increases from said lower limit, and a further connection actuated by said second mentioned pressure responsive device for causing said first mentioned adjustment to reduce fuel delivery progressively as reduction in fluid delivered occurs.*

*7. In combination, in a motor driven compressor which comprises fuel-pumping means having an adjustment for the quantity of fuel pumped and which further comprises a device for varying the quantity of fluid delivered per stroke which device has an adjustment which controls the quantity of delivered fluid, a pressure responsive device responsive to compressor discharge pressure from atmospheric pressure to the lower limit of the designed operating range, another pressure responsive device responsive to compressor discharge pressure from said lower limit to maximum desired compressor discharge pressure, an operating connection between said first mentioned pressure responsive device and said first mentioned adjustment by which said pressure responsive device causes said adjustment to increase fuel supply with increasing compressor discharge pressure, said operating connection including a lever to which, between its ends, said first mentioned pressure responsive device is connected and which has one of its opposite arms connected to said first mentioned adjustment, an operating connec-*

*tion between said second mentioned pressure responsive device and said second mentioned adjustment by which said second mentioned pressure responsive device causes said second mentioned adjustment to reduce the quantity of fluid compressed and delivered per stroke as compressor discharge pressure increases from said lower limit, and a further connection actuated by said second mentioned pressure responsive device and connected with the arm of said first mentioned lever which is not connected with said first mentioned adjustment for causing said first mentioned adjustment to reduce fuel delivery progressively as reduction in fluid delivered takes place.*

*8. In combination, in a motor driven compressor which comprises fuel-pumping means having a plunger with a shaped control-edge and an adjustment for the quantity of fuel pumped and which motor driven compressor further comprises a device for varying the quantity of fluid delivered per stroke, which device has an adjustment which controls the quantity of delivered fluid, a pressure responsive device responsive to compressor discharge pressure from a lower pressure to the lower limit of the designed operating range, another pressure responsive device responsive to compressor discharge pressure from said lower limit to maximum desired compressor discharge pressure, an operating connection between said first mentioned pressure responsive device and said first mentioned adjustment by which said pressure responsive device causes said adjustment to increase fuel supply with increasing compressor discharge pressure, said operating connection including a movement varying device actuated by said first mentioned pressure responsive device for maintaining fuel delivery in step with compressor discharge pressure changes, an operating connection between said second mentioned pressure responsive device and said second adjustment by which said second mentioned pressure responsive device causes said second mentioned adjustment to reduce the quantity of fluid compressed and delivered per stroke as compressor discharge pressure increases from said lower limit, and a further connection actuated by said second mentioned pressure responsive device for causing said first mentioned adjustment to reduce fuel delivery in step with reduction in fluid delivered.*

*9. In combination, in a motor driven compressor which comprises fuel-pumping means having a plunger with a control-edge modified from a true helix and having an adjustment for the quantity of fuel pumped, a device for varying the quantity of fluid delivered per stroke which device has an adjustment which controls the quantity of delivered fluid, a pressure responsive device responsive to compressor discharge pressure from a lower base pressure to the lower limit of the designed operating range, another pressure responsive device responsive to compressor discharge pressure from said lower limit to maximum desired compressor discharge pressure, an operating connection between said first mentioned pressure responsive device and said first mentioned adjustment by which said pressure responsive device causes said adjustment to increase fuel supply with increasing compressor discharge pressure, said operating connections including mechanical connections transmitting adjusting movements, directly proportional to the movement of said first pressure responsive device, to said plunger, an operating connection between said second mentioned pressure responsive device and said second adjustment by which said second mentioned pressure responsive device causes said second mentioned adjustment to reduce the quantity of fluid compressed and delivered per stroke as compressor discharge pressure increases from said lower limit, and a further connection actuated by said second mentioned pressure responsive device for causing said first mentioned adjustment to reduce fuel delivery in step with the reduction in fluid delivered.*

*10. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move together, in combination, hydraulically operable expansible chamber mechanism for holding the inlet valve open through a portion of the discharge stroke of the piston, a hydraulic impulse giver having means for varying the period over which it delivers its impulse, means connecting said impulse giver with said hydraulically operable expansible chamber mechanism whereby impulses delivered by the former control the operation of the latter, and means governed by compressor discharge pressure for adjusting said means for varying the period of delivery of the impulse by said impulse giver to vary such period.*

*11. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move together, in combination, hydraulically operable expansible chamber mechanism for holding the inlet valve open through a portion of the compression stroke of the piston, a hydraulic impulse giver having means for varying the duration of its impulses, conduit means connecting said impulse giver with said hydraulically operable expansible chamber mechanism and transmitting impulses delivered by the former to the latter, and means responsive to compressor discharge pressure for adjusting said means for varying the duration of the delivery of the impulses by said impulse giver to vary such duration.*

*12. In apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move together, in combination, hydraulically operable expansible chamber mechanism for holding the inlet valve open through a portion of the compression stroke of the piston, a hydraulic impulse giver having means for varying its delivery of its impulse, conduit means connecting said impulse giver with said hydraulically operable expansible chamber mechanism whereby impulses delivered by the former control the operation of the latter, means controlled by said shaft for causing said impulse giver to initiate an impulse during the suction stroke of said piston, and means governed by compressor discharge pressure for adjusting said means for varying the delivery of the impulse by said impulse giver to vary the time during which the expansible chamber mechanism is subject to the impulse.*

*13. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in given relation to each other, in combination, hydraulically operable expansible chamber mechanism for holding the inlet valve open through a portion of the compression stroke of the piston, a hydraulic impulse giver having an angularly displaceable plunger having a shaped control edge for varying the period of delivery of its impulse, conduit means connecting said impulse giver with said hydraulically operable expansible chamber mechanism whereby im-*

*pulses delivered by the former control the operation of the latter, means controlled by said shaft for causing said impulse giver to initiate its impulse during the suction stroke of said piston, and means governed by compressor discharge pressure for adjusting said angularly displaceable plunger for varying the time during which the expansible chamber mechanism is subject to the impulse.*

*14. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, an oscillating shaft and a connection between said shaft and piston such that they move in given relation to each other, in combination, hydraulically operable expansible chamber mechanism for holding the inlet valve open through a portion of the compression stroke of the piston, a hydraulic impulse giver having means for varying the period during which it delivers its impulse, conduit means connecting said impulse giver with said hydraulically operable expansible chamber mechanism whereby impulses delivered by the former control the operation of the latter, and means governed by compressor discharge pressure for adjusting said means for varying the period of delivery of the impulse by said impulse giver to vary its duration.*

*15. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in a given relation to each other, in combination, hydraulically operable expansible chamber mechanism for holding the inlet valve open through a portion of the compression stroke of the piston, a hydraulic impulse giver, conduit means connecting said impulse giver with said hydraulically operable expansible chamber mechanism whereby impulses delivered by the former control the operation of the latter, and means governed by compressor discharge pressure for varying the control by said impulse giver of said hydraulically operable expansible chamber mechanism.*

*16. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in given relation to each other, in combination, hydraulically operable expansible chamber mechanism for holding the inlet valve open through a portion of the compression stroke of the piston, a hydraulic impulse giver having means for varying the period it delivers its impulse, means connecting said impulse giver with said hydraulically operable expansible chamber mechanism whereby impulses delivered by the former control the operation of the latter, and means governed by compressor discharge pressure for adjusting said means for varying the period during which the expansible chamber mechanism is subject to the impulse.*

*17. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in given relation to each other, in combination, hydraulically operable expansible chamber mechanism for holding the inlet valve open through a portion of the compression stroke of the piston, a hydraulic impulse giver having means for varying the instant at which it delivers its impulse, means connecting said impulse giver with said hydraulically operable expansible chamber mechanism whereby impulses delivered by the former control the operation of the latter, and means governed by compressor discharge pressure for adjusting said means for varying the instant of delivery of the impulse by said impulse giver to vary such instant.*

*18. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in given relation to each other, in combination, hydraulically operable expansible chamber mechanism for holding the inlet valve open through a portion of the compression stroke of the piston, a hydraulic impulse giver having means for varying the period during which fluid delivered by the impulse giver is displaced, means connecting said impulse giver with said hydraulically operable expansible chamber mechanism whereby impulses delivered by the former control the operation of the latter, and means governed by compressor discharge pressure for adjusting said means for varying the period of fluid displacement by said impulse giver to vary such period.*

*19. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in given relation to each other, in combination, hydraulically operable expansible chamber mechanism for holding the inlet valve open through a portion of the compression stroke of the piston, a hydraulic impulse giver having means for providing impulses of varied duration but having like initiations, means connecting said impulse giver with said hydraulically operable expansible chamber mechanism whereby impulses delivered by the former control the operation of the latter, and means governed by compressor discharge pressure for adjusting said means for varying the durations of delivery of the impulse by said impulse giver to vary such durations.*

*20. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in a given relation to each other, in combination, hydraulically operable expansible chamber mechanism for holding the inlet valve open through a portion of the compression stroke of the piston, a hydraulic impulse giver, means connecting said impulse giver with said hydraulically operable expansible chamber mechanism whereby impulses delivered by the former control the operation of the latter, said hydraulic impulse giver having a fluid displacing plunger reciprocable to displace fluid to said hydraulically operable expansible chamber mechanism and rotatable to vary the period during which it provides an impulse, means for initiating the fluid displacing stroke of said plunger during the suction stroke of said piston, and means governed by compressor discharge pressure for adjusting the duration of the impulse.*

*21. In an apparatus of the character described, in combination, a free-piston motor-compressor including at least one pair of motor pistons each having a compressor piston connected with it for reciprocation, means for delivering varied quantities of fuel to effect actuation of*

*the motor pistons, means for varying the quantity of fluid pumped by the compressor pistons, means governed by the discharge pressure against which the compressor pistons deliver fluid for effecting an increase in the quantity of fuel delivered proportional to the increase in work load effective until the discharge pressure reaches the lower limit of a desired pressure spread within which the motor-compressor is intended normally to operate, and means effective thereafter and until the upper limit of such pressure spread is reached and also governed by the discharge pressure against which the compressor pistons deliver fluid for progressively cutting down the quantity of air delivered as pressure increases and for concurrently progressively reducing the quantity of fuel injected.*

*22. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, a shaft and a connection between said shaft and piston such that they move in given relation to each other, in combination, hydraulically operable means for effecting venting of said cylinder during a portion of the compression stroke of the piston, a hydraulic impulse giver having means for varying the duration of the time it delivers its impulse, means connecting said impulse giver with said hydraulically operable means whereby impulses delivered by the former control the operation of the latter, and means governed by compressor discharge pressure for adjusting said means for varying the duration of the time of delivery of the impulse by said impulse giver to vary such duration.*

*23. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, an oscillating shaft and a connection between said shaft and piston such that they move in synchronism, in combination, hydraulically operable expansible chamber mechanism for holding the inlet valve open through a portion of the compression stroke of the piston, a hydraulic impulse giver having means for varying the time it delivers its impulse, conduit means connecting said impulse giver with said hydraulically operable expansible chamber mechanism whereby impulses delivered by the former control the operation of the latter, and means governed by compressor discharge pressure for adjusting said means for varying the time of delivery of the impulse by said impulse giver to vary such time.*

*24. In an apparatus for varying the quantity of fluid delivered per stroke by a compressor which includes a reciprocable piston, a cylinder for said piston, said cylinder and piston coacting to form a chamber in which compression of a fluid is effected by relative movement between said cylinder and piston, said cylinder having an inlet valve, a shaft and a connection between said shaft and piston such that they move in synchronism, in combination, hydraulically operable expansible chamber mechanism for holding the inlet valve open through a portion of the compression stroke of the piston, a hydraulic impulse giver having means for varying the period during which it displaces fluid, means connecting said impulse giver with said hydraulically operable expansible chamber mechanism whereby impulses delivered by the former control the operation of the latter, and means governed by compressor discharge pressure for adjusting said means for varying the period of fluid displacement by said impulse giver to vary such period.*

*25. In combination, in a motor driven compressor which comprises fuel-pumping means having an adjustment for the quantity of fuel pumped and which further comprises a device for varying the quantity of fluid delivered per stroke which device has an adjustment which controls the quantity of delivered fluid, a pressure responsive device responsive to compressor discharge pressure from a base pressure to the lower limit of the designed operating range, another pressure responsive device responsive to compressor discharge pressure from said lower limit to maximum desired compressor discharge pressure, an operating connection between said first mentioned pressure responsive device and said first mentioned adjustment by which said pressure responsive device causes said adjustment to increase fuel supply with increasing compressor discharge pressure, said operating connection including a lever having three points therealong at which connections thereto are made, said first mentioned pressure responsive device being connected to one of said connection points and said first mentioned adjustment being connected at another of said points, an operating connection between said second mentioned pressure responsive device and said second mentioned adjustment by which said second mentioned pressure responsive device causes said second mentioned adjustment to reduce the quantity of fluid compressed and delivered per stroke as compressor discharge pressure increases from said lower limit, and a further connection actuated by said second mentioned pressure responsive device and connected with the third of said connection points for causing said first mentioned adjustment to reduce fuel delivery progressively as reduction in fluid delivered takes place.*

References Cited in the file of this patent or the original patent

UNITED STATES PATENTS

| | | |
|---|---|---|
| 1,572,998 | Harris | Feb. 16, 1926 |
| 2,064,976 | Janicke | Dec. 22, 1936 |
| 2,086,228 | Janicke | July 6, 1937 |
| 2,115,921 | Steiner | May 3, 1938 |
| 2,130,721 | Kadenacy | Sept. 20, 1938 |
| 2,132,083 | Pescara | Oct. 4, 1938 |
| 2,147,935 | Steiner | Feb. 21, 1939 |
| 2,408,399 | Kadenacy | Oct. 1, 1946 |
| 2,473,204 | Huber | June 14, 1949 |
| 2,501,056 | Kalitinsky | Mar. 21, 1950 |
| 2,535,558 | Welsh | Dec. 26, 1950 |
| 2,611,233 | Welsh | Sept. 23, 1952 |
| 2,638,266 | Meitzler | May 12, 1953 |
| 2,666,569 | Bent | Jan. 19, 1954 |

FOREIGN PATENTS

| | | |
|---|---|---|
| 539,953 | Great Britain | Sept. 30, 1941 |